United States Patent Office.

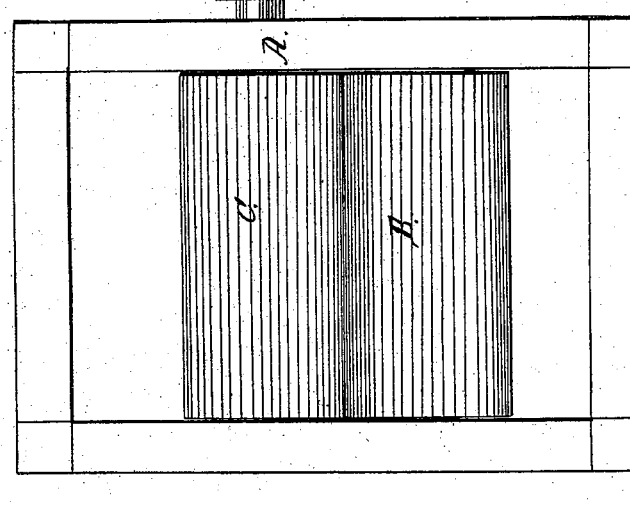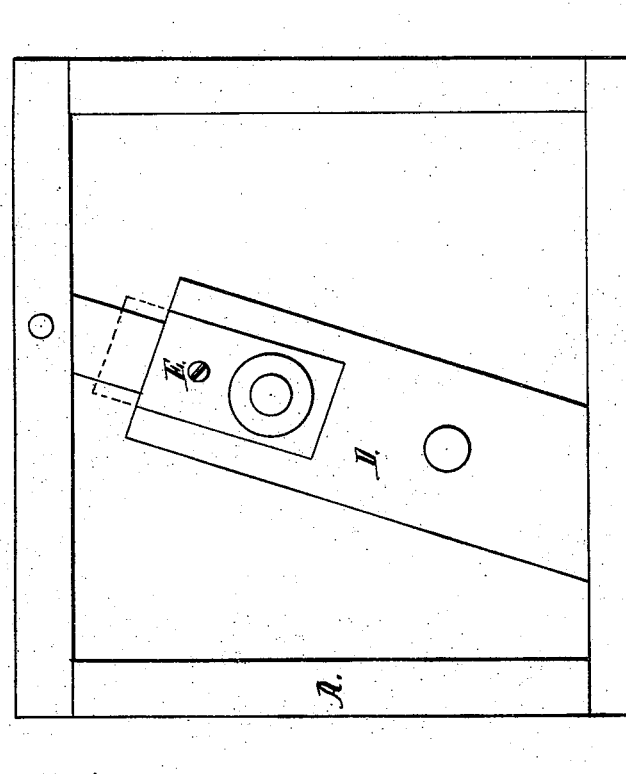

B. S. BURGAN, OF CONGRESS, OHIO.

Letters Patent No. 85,725, dated January 12, 1869.

IMPROVEMENT IN FLAX-BOLL BRAKE.

The Schedule referred to in these Letters Patent and making part of the same.

*To all whom it may concern:*

Be it known that I, B. S. BURGAN, of Congress, in the county of Wayne, State of Ohio, have invented certain new and useful Improvements in Flax-Boll Brake; and I do hereby declare that the following is a full and complete description of the same, reference being had to the accompanying drawings, making a part of this specification, in which—

Figure 1 is a side view of the brake.
Figure 2, a front view.

Like letters of reference refer to like parts in the several views presented.

The nature of this invention relates to a flax-boll brake, consisting of a pair of fluted rollers, running upon each other, and as the bolls are passed between, they are broken, and the seed liberated from the capsules.

In fig. 1, A represents a strong wooden frame, in which are secured the companion-rollers, B C.

Roller B is journalled in a standard, D, whereas roller C is journalled in a movable block, E, whereby said roller can be adjusted in its relation of distance to the roller B, so that the two rollers can be made to run closely upon each other, or distant, as the nature of the work may require.

As above said, the purpose of this machine is for breaking flax-bolls for the removal of the seed, which is usually done, first, by running the flax through a threshing-machine, whereby the bolls are beaten from the stalks. The bolls or capsules are then broken by the use of a flail, or, as is sometimes done, by treading upon them with horses, thereby breaking them up so that the seed can be fanned out.

This process is one of much labor and expense, and by no means complete, as much of the seed is left in the pods, they not being sufficiently broken to allow the escape of the seed.

To avoid this trouble and labor, the detached bolls are run through the rollers referred to, which will crush the capsules, and permit the escape of the seed, thereby performing the work in a complete and expeditious manner.

This apparatus may be attached to the threshing-machine, and operated conjointly therewith, or it can be run separately, and driven by any appropriate power.

What I claim as my invention, and desire to secure by Letters Patent, is—

The special construction and application of the rollers B C, for breaking flax-bolls, when arranged and operated in the manner herein described.

B. S. BURGAN.

Witnesses:
J. H. BURRIDGE,
FRANK S. ALDEN.